United States Patent Office 3,746,756
Patented July 17, 1973

3,746,756
PROCESS FOR OZONIZING LOW MOLECULAR WEIGHT OLEFINS
Harold E. Mains and Herman F. Oehlschlaeger, Cincinnati, Ohio, assignors to Emery Industries, Inc., Cincinnati, Ohio
No Drawing. Filed Oct. 5, 1971, Ser. No. 186,792
Int. Cl. C07c 53/22, 55/22
U.S. Cl. 260—533 R                    5 Claims

ABSTRACT OF THE DISCLOSURE

The present invention relates to an improved process for ozonizing low molecular weight olefins wherein the dangers inherent with such a reaction due to the formation of potentially explosive ozonide fog are minimized. By the formation of an "ene" adduct with the olefin prior to reaction with ozone the ozonization of low molecular weight olefins may be safely conducted at temperatures significantly higher than has heretofore been possible.

BACKGROUND OF THE INVENTION

The ozonolysis of olefins, both aliphatic and cyclic, is known. Typically such ozonolysis reactions are conducted by dissolving the olefin in a solvent and contacting this solution by suitable means with ozone or a mixture of ozone-containing gases at a temperature from about −100° C. to about 30° C. The ozonide thus produced is then further treated such as by oxidation to obtain acid products or by reduction if alcohol and aldehyde products are desired.

Difficulty is encountered, however, when such processes are conducted employing the lower molecular weight more volatile olefins containing 10 carbon atoms or less. During the ozonization of these olefins the formation of a dense white fog, presumably very fine particles of the olefin ozonide and other peroxide materials, can be observed over the reaction mixture and in the exhaust gas stream. The fogging problem is particularly prevalent when operating at temperatures above about 0° C. and at high olefin concentrations.

Like most peroxidic compounds the olefin ozonides are unstable and capable of spontaneously decomposing. The explosive potential of these compounds is greatly increased when they are present in high concentrations or at elevated temperatures, as might be encountered in localized areas of the reactor or other process equipment. For example, as the fog is swept along solid ozonide may collect in a given location within the system and even though the ovrall concentration of the fog does not appear to be high, in these isolated areas the ozonide may reach dangerous levels. If the reactor is not sufficiently cooled or if the temperature is not uniform within the equjpment, detonation of the ozonide may occur.

The amount of fogging depends primarily on (1) the volatility of the olefin being ozonized; (2) the concentration of the olefin; (3) the nature and amount of solvent employed; and (4) the temperature of ozonization. Other factors have an affect on the amount of fog but are generally considered to be of less significance. As might be expected the fog can be almost completely eliminated and the reaction conducted in relative safety if the ozone is well dispersed in the reaction medium, the olefin concentration is kept low and the reaction is conducted at very low temperatures, however, obtaining a good dispersion of the ozone in the viscous ozonide solutions is not possible at low operating temperatures. Neither is it practical from a commercial standpoint to conduct the reaction at low olefin concentrations and at extremely low temperatures since slow reaction rates are obtained, the output of the reactors is very low and large amounts of solvent are required.

It would be highly desirable and advantageous if a process for ozonizing low molecular weight olefins was available wherein the ozonization could be conducted at temperatures sufficient to insure rapid reaction rates while minimizing or completely eliminating any explosive hazard. Operating at higher temperatures would, in addition to increasing reactor output, also reduce the viscosity of the reaction mixture thereby making it possible to obtain better dispersion of the ozone or ozone-containing gas. It would be even more desirable if the olefin concentration could be increased and the amount of solvent decreased and still operate in relative safety.

SUMMARY OF THE INVENTION

We have now discovered an improved process for the ozonization of low molecular weight olefins wherein the process may unexpectedly be conducted at elevated temperatures with little or no danger of explosion. Enhanced rates of reaction are obtained while minimizing the explosive potential of the process as a result of eliminating the presence of dangerous ozonide fogs. The ability to safely operate at higher than usual reaction temperatures permits better dispersion of the ozone or ozone-containing gases in the reaction mixture and also makes it possible to increase the concentration of the olefin in the reaction mixture. The present process employs an "ene" adduct formed by prereacting the olefin with a suitable dienophile. The "ene" adduct thus formed is then ozonized to yield fatty acid products. By forming the "ene" precursor the volatility of the resulting ozonides is markedly reduced due to their increased molecular weights. Also, the polarity is increased resulting in better compatibility with the solvents employed. An additional benefit of the present process, in addition to the production of fatty acids, is that other useful coproducts may be obtained by judicious selection of the dienophile employed to form the "ene" adduct. The present process enables the ozonization to be conducted at temperatures up to about 50° C.

DETAILED DESCRIPTION

The present improved ozonization process which may be safely conducted at elevated temperatures while minimizing the formation of dangerous ozonide fog, thereby reducing the explosive potential of the reaction, employs an "ene" adduct formed by prereacting an olefin with a suitable dienophile. Advantages associated with the use of the "ene" adduct rather than the olefin per se are that the ozonides of the adduct are considerably less volatile than olefin ozonides due to their increased molecular weight and also the adducts have increased polarity and therefore are more compatible with the solvents typically employed for the reaction. The use of the "ene" adducts has the additional advantage of making possible the production of valuable coproducts the nature of which depends on the particular dienophile employed.

Olefins useful to form the "ene" adducts of the present invention have the structural formula

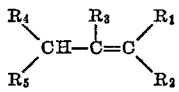

wherein $R_1$, $R_2$, $R_3$, $R_4$ and $R_5$ are, independently, hydrogen or an alkyl radical containing from 1 to 13 carbon atoms, the total number of carbon atoms of the combined R groups not exceeding about 13. From the above formula it is evident that the olefins contain an allylic hydrogen atom and may contain from about 3 to 16 carbon atoms. Preferred olefins of the above formula are α-olefins containing from 3 to 16 carbon atoms where $R_1$ and $R_2$ are hydrogen and $R_3$, $R_4$, and $R_5$ are, independently, hydrogen or alkyl groups containing from 1 to 9 carbon atoms, the total number of carbon atoms of the combined alkyl groups not to exceed 13. In an especially preferred embodiment of the present invention α-olefins containing about 5 to 10 carbon atoms are reacted with suitable dienophiles to form the "ene" adduct. With these especially preferred olefins, $R_1$, $R_2$, $R_3$, and $R_4$ are hydrogen and $R_5$ is an alkyl group containing about 2 to 7 carbon atoms. These latter olefins include pentene-1, hexene-1, heptene-1, octene-1, nonene-1, decene-1 and mixtures thereof.

Dienophiles to be reacted with the olefins are compounds containing ethylenic unsaturation with one or more electron withdrawing groups in conjugated relation to said unsaturation which have the general formula

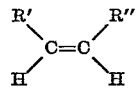

wherein R' is an electron withdrawing group selected from the group consisting of nitrile or a radical of the formula

where X is hydrogen, hydroxyl or an alkyl or alkoxy radical containing from 1 to 9 carbon atoms, and R" is hydrogen or an electron withdrawing group selected from the radicals enumerated above for R'; or R' and R" form a cyclic biradical of the formula

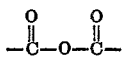

Particularly useful dienophiles for reaction with the olefin are those where the ethylenic unsaturation is conjugated with respect to two carbonyl groups such as with the following compounds: maleic acid, fumaric acid, aconitic acid, itaconic acid, mesaconic acid, isopropylidene malonic acid, chloromaleic acid, dichlorofumaric acid, maleic chloride, maleic anhydride, benzylmaleic anhydride, phenylmaleic anhydride, ethylmaleic anhydride, dichloromaleic anhydride, succinic anhydride, citraconic anhydride and the like. Maleic acid and maleic anhydride are especially useful dienophiles for the present invention.

The formation of the "ene" adduct proceeds according to the following reaction scheme:

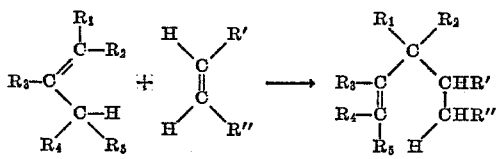

wherein $R_1$, $R_2$, $R_3$, $R_4$, $R_5$, R' and R" are the same as defined above. The method for preparing the adduct is not critical for the success of the present process and any known method such as described in U.S. Pats. Nos. 2,365,703 and 2,819,279 may be employed. Temperature, pressure and the other variables may be widely varied and will depend on the olefin and dienophile being reacted. The adducts are typically prepared by thermally reacting in excess of the olefin with the dienophile. Reactions are generally carried out in the temperature range 160 to 250° C. for several hours. A nitrogen atmosphere is generally employed. The crude adduct is obtained by vacuum stripping unreacted starting materials. Further distillation may be desirable if pure adduct is to be obtained. Polymerization inhibitors, ranging from about 0.4 to about 0.15 weight percent of the olefin, may be added to the reaction mixture to minimize formation of undesirable coproducts such as addition polymers of the olefin and dienophile. Suitable catalysts, while not necessary to the formation of the "ene" adduct, may be employed if desired to reduce reaction time and temperature requirements. Known catalysts such as elemental iodine, metals or metal salts, or the like; may be advantageously employed.

The manner and mode of conducting the ozonization of the "ene" adduct is not critical to the success of the present process. The improvement contained herein is adaptable to and may be useful with, any ozonization method heretofore employed for the ozonolysis of α-olefins or similarly related compounds. When the "ene" adducts are employed, however, the temperature at which the ozonization is conducted may be increased to obtain improved reaction rates without increasing the explosive potential of the reaction due to elimination of fog formation. The temperature employed with the "ene" adducts may safely range up to about 50° C. or the temperature at which the ozonide itself decomposes. While any temperature below about 50° C. may be employed, the advantage of the present process is minimized if the reaction is conducted at extremely low temperatures. As a practical matter the temperature should not be below about $-100°$ C. and more preferably not below about $-20°$ C. Best results are obtained as a result of obtaining superior dispersion of ozone in the reaction mixture and increased rates of reaction at temperatures between about 10° C. and 40° C.

Any of the previously described ozonization methods such as those in U.S. Pat. Nos. 2,819,279, 3,083,209, 3,284,492, 3,414,518 and 3,414,594 may be employed. The ozonization may be conducted as a batch, continuous or semicontinuous process. Ozonolysis and decomposition of the resulting ozonides may be carried out simultaneously or in separate and distinct operations. The process may be conducted in a solvent with or without water. It is generally felt that improved yields and purer products are obtained with a solvent and when water is used. The nature of the solvent can be widely varied depending on the products being formed. Exceptional results are obtained with the present process when organic acids such as acetic, propionic, caproic or like acids are employed. Additional advantage is possible by employing as solvent the predominant fatty acid obtained from the ozonolysis of the "ene" adduct. The reaction is normally conducted at atmospheric pressure although higher or lower pressures can be employed if desired. Ozone may be contacted with the "ene" adduct reaction mixture in any suitable manner and any ozone source employed. Commercially available ozonators which supply a mixture of ozone in air or oxygen are generally used. The amount of ozone employed is not critical may be as low as one mol per molar equivalent of "ene" adduct or lower. It is preferred, however, to supply at least stoichiometric amounts of ozone to fully ozonize the "ene" adduct. The amount of ozone required will vary depending on the particular "ene" adduct employed. For example, for the "ene" adduct derived from maleic anhydride and an α-olefin about 1 to 2 mols ozone will be employed. The products are recovered by conventional methods of extraction, distillation, recrystallization or the like whereby fatty acids can be readily separated from the coproducts.

In a preferred embodiment of the present invention, the "ene" adducts formed by the reaction of an α-olefin containing from 5 to 10 carbon atoms with a dienophile selected from the group consisting of maleic acid or maleic anhydride are ozonized. With these adducts it is possible to obtain fatty acids having $n-2$ carbon atoms where $n$ represents the number of carbon atoms in the $\alpha$-olefin. The production of $n-2$ fatty acids as the predominant product is desirable in many instances and not possible by the ozonization of the $\alpha$-olefin per se which yields predominantly $n-1$ fatty acids. Also, with the present preferred embodiment a useful polyfunctional acid coproduct, tricarballylic acid, is also obtained.

The following examples illustrate the invention more fully, however, they are not intended to limit the scope of the present invention. In the examples all parts and percentages are on a weight basis unless otherwise indicated.

Example I

To demonstrate the process of the present invention n-octenyl succinic anhydride was ozonized, the reaction proceeding smoothly with no fogging, to give caproic acid and tricarballylic acid. The n-octenyl succinic anhydride adduct was prepared by reacting 3 mols octene-1 with one mol maleic anhydride for about 4.5 hours over a temperature range from 160 to 220° C. About 0.15% pyrogallic acid, based on the olefin, was employed to inhibit polymerization. 72% conversion of maleic anhydride to crude adduct was obtained after the reaction mixture was distilled to remove unreacted starting materials. The distillation of the crude adduct from polymeric materials yielded 88% of theory of pure n-octenyl succinic anhydride.

The n-octenyl succinic anhydride was ozonized as follows: 266 grams n-octenyl succinic anhydride (1.27 mol) was dissolved in 532 grams propionic acid and the solution filtered. This solution was then contacted with ozone by recirculating in a climbing film apparatus maintained at a temperature from about 6 to 12° C. The flow of oxygen/ozone gas mixture was maintained at about 0.25 to 0.30 cu. ft. per minute. Reaction with ozone was terminated when about 20 to 30% ozone was being absorbed. The resulting light yellow ozonide was added dropwise over a 1½ hour period to a small amount of pripionic acid containing .67 gram potassium hydroxide maintained at 75° C. When this addition was complete the solution was maintained at about 75 to 80° C. for an additional ½ hour before raising the temperature to about 95 to 100° C. and maintaining for another ½ hour and then finally slowly increasing the temperature to 120° C. over a ½ hour period. Throughout these addition and heating periods the oxygen/ozone gas mixture was bubbled into the reaction mixture with vigorous stirring. The ozone feed was cut off and 1% manganous acetate tetrahydrate added to the reaction which was continued with stirring and with the addition of oxygen at 120° C. for an additional 3 hours. The reaction mixture was distilled. 94.1 grams (64% yield) caproic acid was obtained boiling over the range 190 to 206° C. In addition to the caproic acid 180 grams tricarballylic acid was recovered.

Example II

Using the same ozonolysis procedure described in Example I, 250 grams n-octenyl succinic anhydride was ozonized in 500 grams acetic acid containing 10% water. The crude reaction product contained 33.3% caproic acid and 34.8% tricarballylic acid, based on the amount of n-octenyl succinic anhydride charged.

Example III

Example II was repeated except that the solvent was propionic acid containing 10% water and the ozonization temperature ranged from about 6 to 17° C. Caproic acid (96.7% pure) was obtained in 68% yield. Yield of tricarballylic acid was 58% of theory. When the reaction was repeated employing an ozonization temperature from about 12° to 15° C., caproic acid (95+% pure) was obtained in 71% yield along with tricarballylic acid.

Similar results were obtained employing caproic acid as the solvent, both with and without added water. Yields of about 70% were obtained.

Example IV

To demonstrate the versatility of the present process and its application to a wide variety of ozonolysis reactions and "ene" adducts, n-hexadecenyl succinic anhydride was ozonized. Yields of myristic acid and tricarballylic acid were excellent. The ozonolysis procedure was the same as that described in Example I. 368 grams n-hexadecenyl succinic anhydride was dissolved in 460 grams of a commercial pelargonic acid (Emfac 1202 containing about 94% pelargonic acid, 4% caprylic acid and 2% capric acid) and 75 grams water. The ozonization temperature ranged from about 31° C. to about 38° C. The reaction product contained about 42.4% tricarballylic acid and 55.7% fatty acids, based on the n-hexadecenyl succinic anhydride charged. Vapor phase chromatographic analysis of the methyl esters of the fatty acids indicated the following fatty acid composition: 4.5% $C_{15}$ acid, 90.0% $C_{14}$ acid, 2.9% $C_{13}$ acid and 1.5% $C_{12}$ acid.

Example V

Repeating the ozonolysis of Example IV but employing as solvent a different commercial acid mixture (Emfac 1210 containing about 3% $C_5$, 24% $C_6$, 38% $C_7$, 11% $C_8$ and 24% $C_9$ acids) with about 16.5% by weight water, commercial grade n-hexadecenyl succinic anhydride was ozonized over the temperature range 6 to 19° C. The reaction product contained 47.3% by weight tricarballylic acid and 45.5% by weight myristic acid, based on the n-hexadecenyl succinic anhydride charge.

Example VI 300 grams commercial grade n-hexadecenyl succinic anhydride was ozonized over the temperature range 15 to 27° C. in 600 grams propionic acid containing 10% by weight water. Myristic acid was obtained in 81% yield, based on theory. The yield of tricarballylic acid was nearly 90% of theory.

We claim:

1. In a process for the production of fatty acids by the ozonization of low molecular weight olefins, the improvement comprising:
   (a) forming an "ene" adduct by the reaction of an olefin containing from about 3 to 16 carbon atoms and having the formula

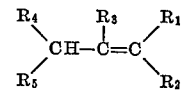

wherein $R_1$, $R_2$, $R_3$, $R_4$ and $R_5$ are, independently, hydrogen or an alkyl radical containing from 1 to 13 carbon atoms, the total number of carbon atoms of the combined R groups not exceeding 13, with a dienophile having 1 or more electron withdrawing groups in conjugated relation to ethylenic unsaturation selected from the group consisting of maleic acid, fumaric acid, aconitic acid, itaconic acid, mesaconic acid, isopropylidene malonic acid, chloromaleic acid, dichlorofumaric acid, maleic anhydride, benzylmaleic anhydride, phenylmaleic anhydride, ethylmaleic anhydride, dichloromaleic anhydride, succinic anhydride and citraconic anhydride; and
   (b) ozonizing said "ene" adduct at a temperature from about −20° C. to about 50° C. in an organic acid solvent.

2. The process of claim 1 wherein the olefin is an $\alpha$-olefin containing from 3 to 16 carbon atoms wherein $R_1$ and $R_2$ are hydrogen and $R_3$, $R_4$, and $R_5$ are, independently, hydrogen or an alkyl group containing from 1 to 9 carbon atoms, the total number of carbon atoms of the combined alkyl groups not exceeding 13, and the dienophile is maleic acid or maleic anhydride.

3. The process of claim 2 wherein the α-olefin contains 5 to 10 carbon atoms and where $R_1$, $R_2$, $R_3$ and $R_4$ are hydrogen and $R_5$ is an alkyl group containing from 2 to 7 carbon atoms.

4. The process of claim 2 wherein tricarballylic acid is recovered as a coproduct.

5. The process of claim 1 wherein the "ene" adduct is formed by the reaction of an α-olefin selected from the group consisting of pentene-1, hexene-1, heptene-1, octene-1, nonene-1, decene-1 and mixtures thereof with a dienophile selected from maleic acid and maleic anhydride; the ozonization is conducted in an organic acid solvent at a temperature from about 10° C. to about 40° C.; and tricarballylic acid is recovered and separated from the fatty acids.

References Cited
UNITED STATES PATENTS

| | | | |
|---|---|---|---|
| 3,218,353 | 11/1965 | Volkenburgh et al. | 260—537 X |
| 3,676,473 | 7/1972 | Ellis | 260—533 D |

LORRAINE A. WEINBERGER, Primary Examiner

R. D. KELLY, Assistant Examiner

U.S. Cl. X.R.

260—413, 537 P, 515 P